United States Patent [19]

Martin

[11] 4,369,161
[45] Jan. 18, 1983

[54] RACK AND PINION MECHANISM FOR MOVING A UNIT ABSORBING NEUTRONS IN A NUCLEAR REACTOR

[75] Inventor: Jean Martin, Chatillon, France
[73] Assignee: Framatome, Courbevoie, France
[21] Appl. No.: 166,465
[22] Filed: Jul. 7, 1980
[30] Foreign Application Priority Data
Jul. 11, 1979 [FR] France .................. 79 17978
[51] Int. Cl.³ .............................................. G21C 19/10
[52] U.S. Cl. ................................................... 376/232
[58] Field of Search .................. 376/228, 232, 233
[56] References Cited
U.S. PATENT DOCUMENTS

| | | | |
|---|---|---|---|
| 2,682,785 | 7/1954 | Cerutti et al. | 376/232 |
| 2,857,324 | 10/1958 | Boisblanc et al. | 376/232 |
| 3,278,385 | 10/1966 | Dufrane | 376/232 |
| 3,405,032 | 10/1968 | Barrus et al. | 376/232 |
| 3,518,162 | 6/1970 | Lichtenberger | 376/232 |
| 3,604,746 | 11/1968 | Notari | 376/232 |
| 3,965,757 | 6/1976 | Barrus | 376/232 |

FOREIGN PATENT DOCUMENTS 639362  2/1964  Belgium .................. 376/232

Primary Examiner—Sal Cangialosi
Attorney, Agent, or Firm—Pollock, Vande Sande & Priddy

[57] ABSTRACT

A rack and pinion mechanism for vertical up-and-down movement of neutron-absorbing control elements to control the power and to shut down a nuclear reactor in case of emergency. The upper portions of the elements constitute the rack, engaging a rotatably driven pinion perpendicular thereto and having teeth on a lateral face engaging corresponding teeth of a clutch pinion. The rack and pinion remain on continuous enagement, while the clutch pinion selectively engages and disenages the pinion, the translatory axial movement of the clutch pinion being controlled by a vertically moving actuating member controllable from the upper part of the apparatus.

4 Claims, 2 Drawing Figures

RACK AND PINION MECHANISM FOR MOVING A UNIT ABSORBING NEUTRONS IN A NUCLEAR REACTOR

BACKGROUND OF THE INVENTION

The invention concerns a rack and pinion mechanism for moving a unit absorbing neutrons, movable vertically in a nuclear reactor for controlling the power and for emergency shutdown of the reactor.

PRIOR ART

In nuclear reactors, the regulation of power and emergency shutdown of the reactor are generally obtained by inserting control rods, constituted by tubes containing a material strongly absorbent of neutrons, inside the core.

Power regulation is obtained by progressive movements of the control rods to increase their degree of insertion in the reactor core if power is required to be decreased or, conversely, by movements to reduce the degree of insertion of the control rods if power is required to be increased.

These movements of inserted control rods in the vertical direction from the upper part of the core are made downwards in the first case and upwards in the second case.

When the emergency shutdown is tripped, the control rods are caused to fall under the effect of gravity to their position of maximum engagement in the core.

Movements of the control rods are generally effected by mechanisms disposed in the upper part of the reactor in engagement with a control shaft extending the control rods upwards into a region distant from the reactor core. The association with the control shafts of racks disposed in the longitudinal direction of these shafts, either machined directly in the shaft or added to this shaft, to move the control rods by the setting in rotation of a pinion engaged with the rack solid with the control rod has already been envisaged.

These rack and pinion apparatuses can allow precise movements of the control rods during control of the reactor to be effected, if the pinion is driven in a precisely controlled way. Similarly, it is possible to halt the control rods in a precise position, from the moment the pinion can be kept rotationally stationary. This assumes a suitable motorization of the pinion driving the rack, the means for driving the pinion being associated with a control allowing movements of the control rods to be effected in both directions according to movements with well defined amplitude.

To trip the emergency shutdown, however, it is necessary to disengage the rack from its driving means so as not to obstruct the fall of the rods under the effect of their own weight.

To allow these emergency shutdowns, means for driving the pinion step by step have been proposed, allowing locking in position and releasing of the pinion at the moment of emergency shutdown.

Such apparatuses, of the pawl type, are complicated, however, and their operation is entirely discontinuous.

Systems for engaging and disengaging the pinion have also been proposed, allowing release of the rack at the moment of emergency shutdown, but such apparatuses assume movable mounting of the pinion which complicates the apparatus and makes its working less reliable.

SUMMARY OF THE INVENTION

The object of the invention is therefore a rack and pinion mechanism for moving a unit absorbing neutrons, movable vertically in a nuclear reactor for controlling the power and for emergency shutdown of the reactor, comprising a vertical control shaft whose lower part is connected to the absorbent unit and whose upper part has a rack disposed in the longitudinal direction of the shaft and a pinion driven in rotation by a motor apparatus, in engagement with the rack so as to move the control shaft and the absorbent unit in both directions, this mechanism having to allow precise movements of the control rods and the halting of these rods in well defined positions and the falling of the rods for emergency shutdown of the reactor controlled by a simple apparatus preventing disengagement of the rack and pinion.

To this end, the pinion permanently in engagement with the rack is mounted to rotate on a shaft connected to the motor apparatus for setting the pinion in rotation and disposed perpendicularly to the control shaft, and a clutch device solid with the shaft in rotation is mounted to move in translation on this shaft between a disengagement position in which the pinion and the clutch device are brought into contact and connected by a mechanical means allowing the rotary movement of the shaft to be transmitted to the pinion, the translatory movement of the clutch device in the axial direction of the shaft being controlled by a push-rod connected to an actuating member with vertical movement which is maneuverable from the upper part of the apparatus.

For a full understanding of the invention, an embodiment of the rack and pinion mechanism according to the invention will now be described by way of example, with reference to the attached drawings.

DETAILED DESCRIPTION

Figure 1:
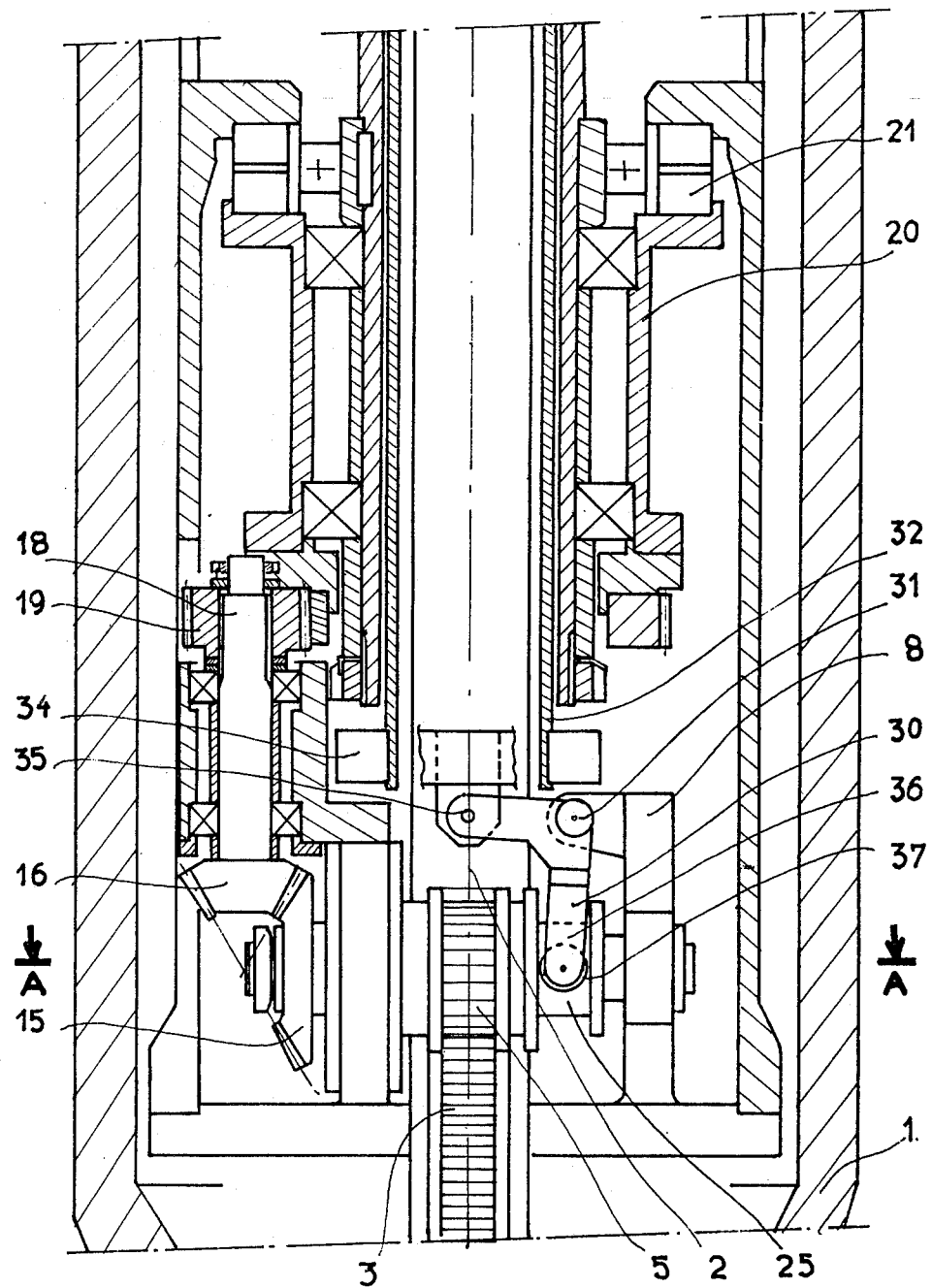
FIG. 1 shows a sectional elevation on the vertical plane of symmetry of the rack and pinion apparatus for moving the control rods.

FIG. 1 shows the cylindrical housing 1 containing the apparatus for moving the control rods disposed with its vertical axis at the upper part of the vessel of the nuclear reactor, this very thick housing being pressure-resistant and communicating at its lower part with the interior of the vessel.

The housing 1 is closed sealingly at its upper part not represented in FIG. 1.

The control shaft 2 disposed along the axis of the housing 1, i.e., disposed with its axis vertical, is connected at its lower part (not shown in FIG. 1) to the upper part of the control rod which is solid with the control shaft in its movements in the vertical direction.

A rack 3 is machined on one part of the control shaft in the longitudinal direction of this control rod.

A pinion 5 whose axis is perpendicular to the axis of the control shaft is in engagement with the rack.

The rack occupies a length of the control shaft which is such that the pinion 5 is able to move the control shaft upwards with the aid of the rack with which it is in engagement to the position of the control shaft corresponding to the position of maximum extraction of the control rod.

The rack is also machined towards the top of the control shaft over a length sufficient for the pinion to remain engaged with this rack when the control rod is in its position of maximum insertion, for example at the time of an emergency shutdown.

The pinion 5 remains constantly engaged with the rack 3, whatever the vertical position of the control shaft 2.

Figure 2:
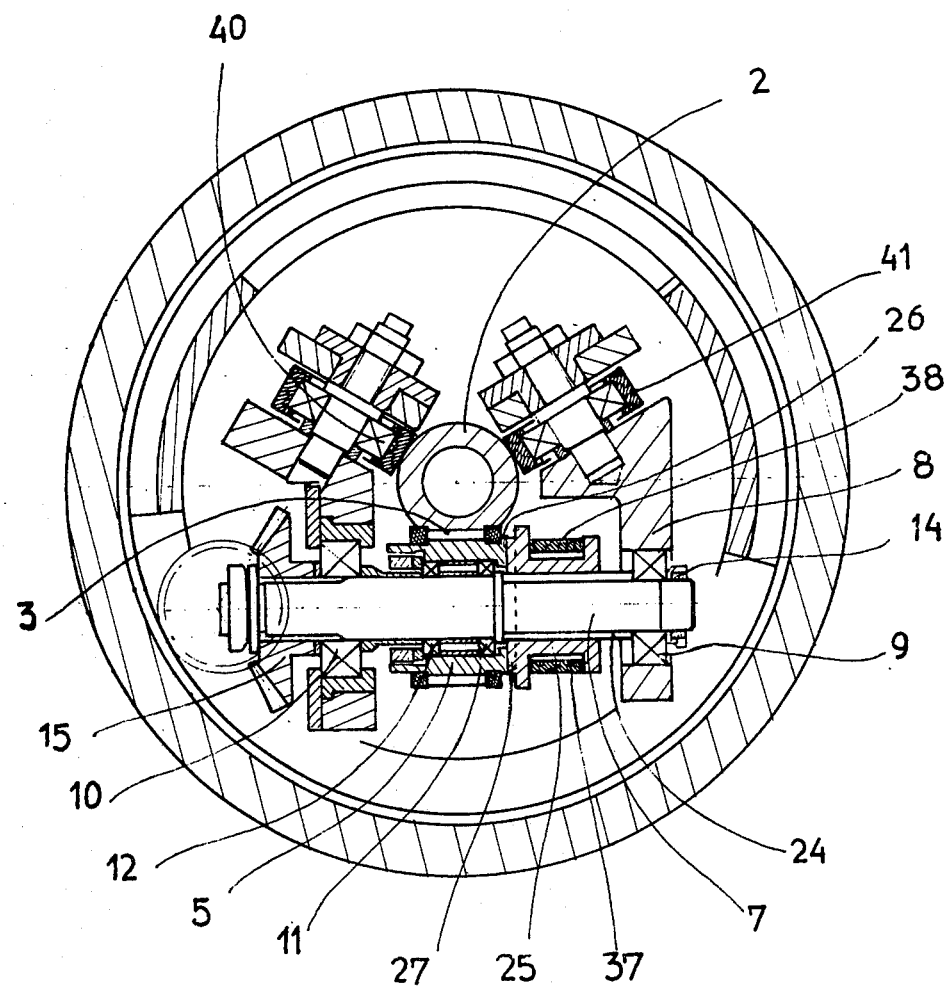
FIG. 2 shows a section view at A—A of FIG. 1.

As FIGS. 1 and 2 show, the pinion 5 is freely mounted on a shaft 7 itself mounted to rotate inside the support 8 of the apparatus for moving the control rod by two bearings 9 and 10.

The pinion 5 is freely mounted on the shaft 7 by bearings 11 and 12 whose inner rings are solid with the shaft 7. In this way, the pinion 5 remains in a fixed position with respect to the rack 3, the shaft 7 being fixed in axial position by a stop 14 and by the back part of a conical pinion 15, both solid with the shaft 7.

The conical pinion 15 itself engages with a conical pinion 16 solid with a shaft 18 mounted to rotate in the support 8 and itself solid at its end opposite the conical pinion 16 with a pinion 19.

The pinion 19 is itself solid in rotation with a ring 20 connected to the output of a reducer 21 whose input is connected to the driven part of a magnetic coupling (not represented in FIG. 1). The motor apparatus for driving the shaft 7, through the magnetic coupling of the reducer and the set of pinions described, is constituted by a three-phase motor disposed outside the magnetic casing 1 which causes a locking in position when it is not supplied.

The three-phase driving motor transmits its rotary movement to the driven part of the magnetic coupling through the casing 1 which therefore remains totally sealed and isolated from the external environment.

When the three-phase motor is set in rotation, this rotary movement is then transmitted to the shaft 7 which continues to move as long as the three-phase motor is supplied and which locks in position when the three-phase motor is no longer supplied.

As FIG. 2 shows, the shaft 7 has grooves 24 over one part of its length while a clutch device made in the form of a pinion 25 has corresponding grooves over its inner bore.

The pinion 25 is engaged on the shaft 7 so as to be solid in rotation with the shaft 7 but movable in translation in the axial direction of this shaft.

The pinion 25 is engaged on the shaft 7 so that its front face 26 comes into contact, at the forward translatory movement of the pinion 25, with the back face 27 of the pinion 5 whose axial position on the shaft 7 is fixed.

The front face 26 of the pinion 25 and the back face 27 of the pinion 5 have corresponding teeth of the "jaw" type which come into engagement at the end of movement.

In this way, the shaft 7, the clutch ring 25 and the driving pinion 5 are solid in rotation when the clutch pinion 25 is in its front position as represented in FIG. 2.

A push-rod 30 is also mounted articulatedly via a shaft 31 on the support 8 of the apparatus for moving the control rods, one of the ends of this push-rod 30 being connected articulatedly to the lower part of an actuating sleeve 32 coaxial with the control shaft 2 and extending to the upper part of the control apparatus.

The sleeve 32 is kept in its high position as represented in FIG. 1 by a magnetic coil, disposed at the upper part of the apparatus and not represented, acting on a magnetic part solid with the upper part of the sleeve 32.

At its base, the sleeve 32 is connected to an actuating ring 34 on which is articulated, at 35, one of the arms of the bent push-rod 30 whose other end is constituted by an actuating fork 36 in engagement with the clutch pinion 25 via two wheels 37 and 38.

In its high position represented in FIG. 1, the actuating sleeve holds, via the bent push-rod 30, the clutch pinion 25 in an advanced position as represented in FIGS. 1 and 2. In this position the teeth of the front face of the clutch 25 are engaged in the teeth of the back face of the pinion 5 for driving the rack.

As long as the coil for holding the sleeve 32 in the high position is supplied, the driving pinion 5 is consequently in mechanical connection with the pinion 25 and the shaft 7 which is itself in mechanical connection with the rotary driving means described.

It is therefore possible to move the control rod in this position, by causing a controlled rotation of the driving pinion 5 by means of the three-phase motor and the whole kinematic chain previously described.

Similarly, it is possible to hold the control rod in position, since the three-phase motor is locked against rotation when it is not supplied. It is therefore possible to obtain all movement of the control rod and any holding of position by control of the supply of the three-phase motor.

If the supply to the coil for holding the sleeve 32 in the high position is interrupted, this sleeve falls under the action of its own weight and drives the push-rod 30 in rotation so that the fork 36 drives the clutch pinion in translation backwards, the clutch teeth 25 and 5 being then disengaged.

The pinion 5 freely mounted for rotation on the shaft 7 then no longer holds the rack 3 and the control rod 2 in position and the control rod is able to fall under the action of its own weight until this control rod, connected to the control shaft 2, arrives at its position of maximum insertion in the reactor core.

Emergency shutdown of the reactor can therefore be obtained by cutting off the supply to the coil for holding the sleeve 32 in position, this being particularly simple and quick.

Throughout its movements, the control shaft 2 is guided by wheels such as 40 and 41 freely mounted on shafts solid with the support 8 of the control apparatus.

Clearly, the principal advantages of the invention are that it allows the use of a rack and pinion apparatus to move a control rod in a reactor during control of this reactor, and holding of the control rod in position, while allowing tripping of the emergency shutdown in an extremely reliable and very simple way, by releasing an actuating sleeve which falls under its own weight.

In this way, all the advantages of the pinion-rack apparatus which allows movements of the control rod in a continuous and shockless motion with precise stopping at any level of the stroke of the control rod are obtained, this mechanism also taking up less room inside the housing over the reactor vessel.

In addition, the mounting of the rack and pinion control apparatus inside the housing over the reactor vessel is particularly simple and does not require a precise positioning in rotation of the apparatus with respect to the control rod.

In addition, after an emergency shutdown, the driving pinion 5 remains engaged with the rack 3, so that all that is required to return the apparatus for moving the control rod to service is to cause the sleeve 32 to return to the high position by supplying the coil for holding this sleeve and to supply the three-phase motor for raising the rod and any other subsequent movement for controlling the reactor.

In addition, the emergency shutdown can be easily and reliably achieved and, to further increase the reliability of the apparatus, a return spring can be associated with the sleeve 32 to reinforce the action of the weight so as to bring the sleeve 32 into the low position.

Furthermore, in the case of the use of a motor for driving the pinion apparatus in rotation, the motor being locked against rotation by cutting off of its supply, holding in position of the control rod is assured without consumption of energy other than the energy supplied to the coil for holding the actuating sleeve in the high position.

In addition, when a magnetic coupling is used to traverse the wall of the housing of the mechanism, for example a permanent magnet apparatus which allows the motor torque to be transmitted through the sealed casing 1 synchronously and with a high output, an automatic limitation of the stresses exerted on the control rod is thus assured since, in the case of excessive stress, the driving and driven parts of the magnetic coupling become uncoupled.

The invention is not limited to the embodiment just described; it includes all the variants thereof and points of detail can be changed without exceeding the scope of the invention.

Thus, instead of a three-phase motor effecting a locking in position by lack of current associated with a magnetic coupling for traversing the sealed housing, any type of braking motor can be used, associated with a rotary mechanical traversing allowing the movement to be transmitted into the sealed housing.

Use of a stepping motor with a shaded rotor (or with a polegap sleeve) is also possible to assure motorization of the apparatus for driving the control rod.

The invention applies to all nuclear reactors in which power control and emergency shutdown is effected by movement in the vertical direction of a unit absorbing neutrons which can be inserted to a greater or lesser depth in the reactor core.

I claim:

1. Rack and pinion mechanism for moving a unit absorbing neutrons movable vertically in a nuclear reactor for controlling the power and for emergency shutdown of said reactor, comprising
   (a) a vertical control shaft whose lower part is connected to said absorbent unit and whose upper part constitutes a rack disposed in the longitudinal direction of said shaft;
   (b) a first pinion rotatably driven by drive means, in engagement with said rack for moving said control shaft and said absorbent unit in both directions;
   (c) said first pinion being in permanent engagement with said rack and being mounted to rotate on a shaft connected to said drive means for setting said first pinion in rotation perpendicularly to said control shaft, said first pinion having teeth on one of its lateral faces;
   (d) a clutch pinion rotatably engaged with said shaft and mounted to move in translation on said shaft, between a disengaged position in which said first pinion and said clutch pinion are at a distance and an engaged position in which said pinion and said clutch pinion are in contact, said clutch pinion having teeth on its face directed toward said lateral face of said first pinion provided with teeth;
   (e) whereby said first pinion and said clutch pinion are connected for transmitting the rotary movement of said shaft to said first pinion, the translatory movement of said clutch pinion in the axial direction of said shaft being controlled by a push-rod connected to a vertically moving actuating member which is maneuverable from the upper part of the apparatus.

2. Rack and pinion mechanism according to claim 1, wherein said actuating member of said push-rod comprises a sleeve coaxial with said control shaft connected at its upper part to a magnetic means and retained in a raised position, in which said push-rod keeps said clutch pinion in an engaged position, by a magnetic coil, stopping of the supply of this magnetic coil causing said sleeve to descend and said push-rod and said clutch pinion to move, so as to achieve emergency shutdown and descent of said control rod under the effect of its own weight.

3. Rack and pinion mechanism according to claim 2, comprising a return spring associated with said sleeve so as to return it to a lower position, said push-rod returning said clutch pinion back into disengaged position.

4. Rack and pinion mechanism according to claim 1, wherein said drive means comprises a three-phase motor locked in position by braking by lack of current disposed outside a sealed casing in communication with the reactor vessel and containing said rack and pinion mechanism, said motor being associated, for transmitting rotary movement to said rack and pinion mechanism, with a permanent magnetic coupling.

* * * * *